US008032790B2

(12) United States Patent
Chopra et al.

(10) Patent No.: US 8,032,790 B2
(45) Date of Patent: Oct. 4, 2011

(54) TESTING OF A SYSTEM LOGGING FACILITY USING RANDOMIZED INPUT AND ITERATIVELY CHANGED LOG PARAMETERS

(75) Inventors: Tarun Chopra, Poughkeepsie, NY (US); Nicholas R. Jones, Poughkeepsie, NY (US); Robert Miller, Jr., Poughkeepsie, NY (US); Thomas F. Rankin, Poughkeepsie, NY (US); Andrew M. Sica, Woodbury, CT (US); Douglas M. Zobre, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1742 days.

(21) Appl. No.: 11/259,893

(22) Filed: Oct. 27, 2005

(65) Prior Publication Data

US 2007/0168967 A1      Jul. 19, 2007

(51) Int. Cl.
*G06F 17/40* (2006.01)
*G06F 11/00* (2006.01)
*G06F 9/44* (2006.01)

(52) U.S. Cl. .................... 714/32; 702/187; 717/126
(58) Field of Classification Search ............... 714/32, 714/38.14; 717/126; 702/187
See application file for complete search history.

(56) References Cited

U.S. PATENT DOCUMENTS

| | | | | |
|---|---|---|---|---|
| 5,673,386 | A * | 9/1997 | Batra ................................ | 714/38 |
| 5,740,408 | A | 4/1998 | Bonne et al. .................. | 395/500 |
| 5,758,062 | A | 5/1998 | McMahon et al. .......... | 395/183.4 |
| 5,877,483 | A | 3/1999 | Bilich et al. .................. | 235/382 |
| 6,349,393 | B1 | 2/2002 | Cox ................................. | 714/38 |
| 6,408,403 | B1 * | 6/2002 | Rodrigues et al. ......... | 714/E11.21 |
| 6,427,000 | B1 | 7/2002 | Mumford et al. ................ | 379/9 |
| 6,754,842 | B2 * | 6/2004 | Kettley et al. ............ | 714/E11.13 |

(Continued)

FOREIGN PATENT DOCUMENTS

EP      0181503 A2      10/1987

(Continued)

OTHER PUBLICATIONS

IBM. "MVS Setting Up a Sysplex." Jun. 2003, International Business Machines Corporation. pp. 177-179 and 191-266. Retrieved from http://www.redbooks.ibm.com/redbooks/pdfs/sg246898.pdf on Aug. 14, 2009.*

(Continued)

*Primary Examiner* — Li Zhen
*Assistant Examiner* — Erika Kretzmer
(74) *Attorney, Agent, or Firm* — Cantor Colburn LLP; William A. Kinnaman, Jr.

(57) ABSTRACT

A method and computer program product for testing a system logger. Randomized input is provided into a logging facility and automated testing of the logging facility is performed in a multi-processing environment. Self-verification of data retrieved from the logging facility is performed to ensure no data loss occurs due to external system events or failures driven by a test tool. Real-time analysis of results received is performed by the test tool based on the randomized input into the logging facility. First failure data is captured and self-verification of results of a data recovery operation of the logging facility is performed in a disaster recovery scenario. Self-verification includes writing log blocks of random sizes to the log stream, iteratively forcing log data to be offloaded from primary storage to secondary storage, iteratively updating log stream attributes, and iteratively swapping duplexing modes.

18 Claims, 2 Drawing Sheets

U.S. PATENT DOCUMENTS

| | | | |
|---|---|---|---|
| 6,826,692 B1 | 11/2004 | White | 713/201 |
| 6,871,221 B1 | 3/2005 | Styles | 709/221 |
| 2002/0010785 A1 | 1/2002 | Katsukawa et al. | 709/229 |
| 2002/0198983 A1* | 12/2002 | Ullmann et al. | 714/45 |
| 2006/0288183 A1* | 12/2006 | Boaz et al. | 711/164 |

FOREIGN PATENT DOCUMENTS

| | | |
|---|---|---|
| JP | 11025040 A | 1/1999 |
| WO | WO 2005036418 A1 * | 4/2005 |

OTHER PUBLICATIONS

Bauer, Mick. "Paranoid penguin: syslog configuration." Dec. 2001, Linux Journal vol. 2001, Issue 92. Retrieved from ACM Portal on Aug. 12, 2009.*

Kyne, Frank; Stephen Anania; Paola Bari; Jim Grauel; Andrew Sica; Bill Stillwell. "Systems Programmer's Guide to: z/Os System Logger." Dec. 1, 2003, IBM Redbooks, sections 2.1, 2.2, 2.4, 2.6, 2.8, 2.9, 3.4, 4.5, 7.1, 7.2, and 7.9, pp. 1-78. Retrieved from Safari ProQuest Tech Books on Jul. 28, 2010.*

Kyne, Frank; Stephen Anania; Paola Bari; Jim Grauel; Andrew Sica; Bill Stillwell. "Systems Programmer's Guide to: z/OS System Logger." Dec. 1, 2003, IBM Redbooks, chapters 1, 2, 3, 4, and 7, pp. 1-134 and 243-262. Retrieved from Rebooks.ibm.com on Jan. 14, 2011.*

Merrill, H.F. Barry. "II. Reducing CPU Consumption with Proper I/O Blocksize and Buffering" in "Merrill's Expended Guide to Computer Performance Evaluation Using the SAS System." 1984, SAS Institute, Inc., pp. 840-852.*

D. J. Decker et al.; "Logon, Security, and Accounting Enhancements in Computing Systems;" IBM Technical Disclosure Bulletin vol. 32 No. 1; Jun. 1989; pp. 345-346.

* cited by examiner

TESTING OF A SYSTEM LOGGING FACILITY USING RANDOMIZED INPUT AND ITERATIVELY CHANGED LOG PARAMETERS

BACKGROUND OF THE INVENTION

1. Field of the Invention

The embodiments of the invention relate to a method and computer program product for verification of the operation and functionality of a data logging facility in a multiple system distributed computing environment.

2. Description of the Related Art

The IBM z/OS System Logger is a function provided by an operating system to exploiters running on z/OS. The number of exploiters of this component is increasing, as is its importance in relation to system performance and availability.

System Logger is a z/OS Multiple Virtual Storage (MVS) component that allows an application to log data from a sysplex. A sysplex can be thought of as a group of computer systems that act as a single entity by communicating with each other at the operating system level. Applications can log data from one system or multiple systems across the sysplex.

The advantage of using a System Logger is that the responsibility for tasks such as saving the log data (with the requested persistence), retrieving the data (potentially from any system in the sysplex), archiving the data, and expiring the data is removed from the creator of the log records. In addition, System Logger provides the ability to have a single, merged log, containing log data from multiple instances of an application within the sysplex.

During both functional and system verification testing of a z/OS System Logger, there is an ongoing problem of how to dynamically and persistently drive all functions of z/OS System Logger in a multiple system environment using a single method. There are many different test tools and applications that drive individual parts of z/OS System Logger, but there are no known tools or methods that have been derived for putting all of the pieces together in a single application.

BRIEF SUMMARY OF THE INVENTION

Embodiments of the invention include a method, and computer program product, for testing a software application program, the method comprising: providing randomized input into a logging facility; performing automated testing of the logging facility in a multi-processing environment; performing self-verification of data retrieved from the logging facility to ensure no data loss occurs due to external system events or failures driven by a test tool; performing real-time analysis of results received by the test tool based on the randomized input into the logging facility; capturing first failure data; and performing self-verification of results of a data recovery operation of the logging facility in a disaster recovery scenario.

Other embodiments of the invention include a method, and computer program product, for testing a software application program, the method comprising: providing randomized input into a logging facility; performing automated testing of the logging facility in a multi-processing environment; and performing a logging function, which is a z/OS System Logger; wherein the automated testing of the System Logger comprises the following tasks; a user interface task; an Event Notification Facility (ENF) monitor task; a main procedure task; and an auxiliary task.

BRIEF DESCRIPTION OF THE DRAWINGS

Further features, aspects and advantages of the apparatus and methods of the embodiments of the invention will become better understood with regard to the following description, appended claims, and accompanying drawings where:

DETAILED DESCRIPTION OF THE INVENTION

Figure 1:
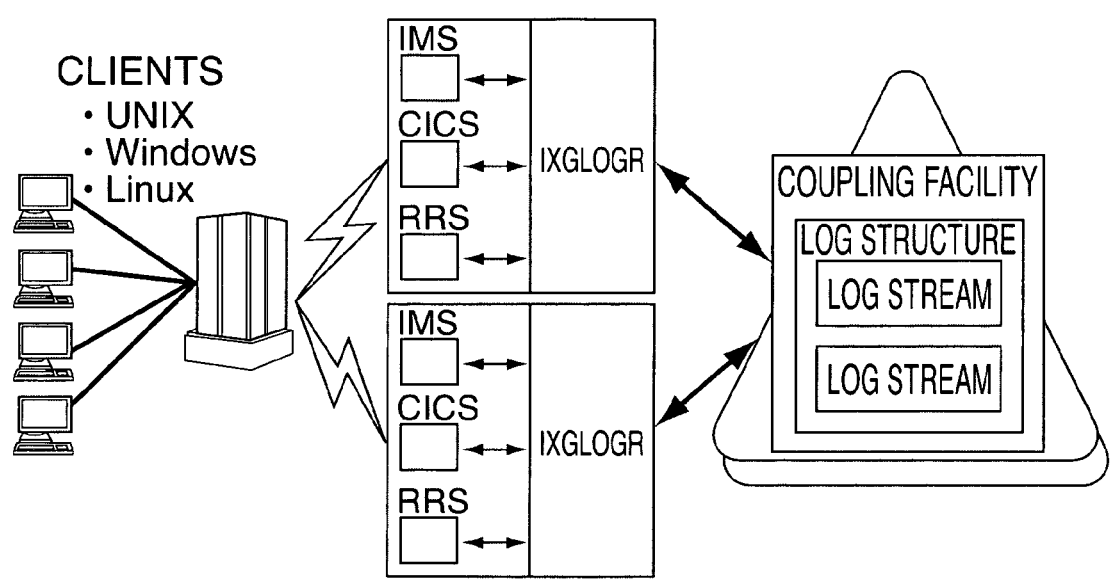
FIG. 1 shows an example of a system z/OS System Logger configuration with a coupling facility.

Embodiments of the invention relate generally to the field of computer architecture and, more specifically, to methods and systems for automatically testing logging facilities in multi-processing environments. Specifically, the embodiments of the invention relate to self-verification of data retrieved from logging facilities and to real-time analysis of results received by a test tool based on randomized input.

The problem solved by the embodiments of the invention apply in any environment where there is a need to test a multiple system logging entity across different systems and continually drive the logging entity with data in order to test its functions. The embodiments of the invention also provide methods for building intelligence into a testing application to respond to system events related to z/OS System Logger operation.

A system is provided where automated testing of a logging facility in a multi-processing environment is performed and doing so simultaneously on multiple systems that share resources in such a configuration. There is also provided a method for self-verification of data retrieved from a logging facility in order to ensure no data loss occurred due to external system events/failures driven by a test tool.

Furthermore, there is provided a method for real-time analysis of results by the test tool based on randomized input into the logging facility and first failure data capture to aid in problem determination of unexpected results. Also, there is provided a method for self-verification of results of the logging facility's data recovery operation in a disaster recovery scenario.

Functions of the embodiments of the invention are its ability to perform long-term stability verification, data integrity validation and use First Failure Data Capture techniques while performing the functional verification test of a multiple system logging entity.

Software embodiments of the invention satisfy the need for a single method of driving and verifying all aspects of a sysplex-wide Logging function. The embodiments of the invention operate as a logging application that continually writes data simultaneously from multiple concurrent systems. It also performs self-verification to ensure no data loss by reading the data back from the logging facility and comparing it to an independent copy of the data.

The method introduces variability by writing randomly sized blocks of data and issues dynamic commands to the operating system to alter the characteristics of the logging facility. It also drives asynchronous logging events and dynamically updates the attributes of the permanent logs. In the event that data loss is detected, the embodiments of the invention capture all relevant first failure data capture information to aid in determining what data is missing as well as identifying the cause of the data loss.

Embodiments of the invention not only drive many different functional paths in the System Logger, but also automatically respond to externally and internally driven stimuli and perform self-verification of all data written using z/OS System Logger services.

A self-contained application can be used to simulate an active logging environment complete with random events and timing windows that would be difficult to produce manually using tests that rely on controlled input. The application implements an algorithm for self-verification of data written to the logging function instead of relying on manual intervention for verifying that the logging function does not lose any data while processing the data used by the application. The application is designed to continuously run through its algorithms until told to stop (either by user command, or automation). Except in the case of system failure, the application remains persistent and performs whatever functions are necessary to keep data flowing to and from the logging function. For system failure and disaster recovery cases, the application uses its independent copy of the data to verify that the logging function has recovered data to a consistent time point after the subsequent re-initialization of the failed system.

The z/OS operating system is a 64-bit server operating system from IBM. It is the successor to the IBM mainframe operating system OS/390, combining Multiple Virtual Storage (MVS) and UNIX System Services (a POSIX-compliant mainframe implementation of UNIX formerly known as MVS Open Edition). z/OS is a highly secure, scalable, high-performance enterprise operating system on which to build and deploy Internet and Java-enabled applications or legacy applications, providing a comprehensive and diverse application execution environment.

Typically, legacy applications are database management systems (DBMSs) running on mainframes or minicomputers. An important feature of new software products is the ability to work with a company's legacy applications, or at least be able to import data from them. In information technology, legacy applications and data are those that have been inherited from languages, platforms, and techniques earlier than current technology. Most enterprises utilize computers that have legacy applications and databases that serve critical business needs.

Embodiments are described in specific terms related to the z/OS MVS System Logger. The same or equivalent techniques would be applicable to different environments where there is a logging application that collects data from multiple systems and whose main function is to maintain the validity and the integrity of the log data.

Referring to FIG. 1, an example of a multiple-system configuration with z/OS System Logger using a coupling facility to share log data between the systems is illustrated. This example shows different MVS applications (IMS, CICS, RRS) that currently use z/OS System Logger to share data between the systems. The logging test tool described here can be considered as another z/OS System Logger application.

An IMS is an Information Management System. An IMS is composed of two systems: a Database Manager (IMS DB) and a Transaction Manager (IMS TM).

A transaction manager interacts with an end user (connected through TCP/IP and Web user interfaces) or another application, processes a business function (such as an banking account withdrawal), and maintains state throughout the process, making sure that the system records the business function correctly to a data store.

IMS TM uses a messaging and queuing paradigm. An IMS control program receives a transaction entered from a terminal (or Web browser or other application) and then stores the transaction on a message queue (in memory or in a dataset). MS then invokes its scheduler on the queued transaction to start the business application program in a message-processing region.

The message-processing region retrieves the transaction from the IMS message queue and processes it, reading and updating IMS and/or DB2 databases, assuring proper recording of the transaction. Then, if required, IMS sends a response message back onto the IMS message queue. Once the output message is complete and available the IMS control program sends it back to the originating terminal. IMS TM can handle this whole process thousands of times per second.

CICS (Customer Information Control System) is a family of application servers and connectors that provides industrial-strength, online transaction management and connectivity for mission-critical applications. CICS is a transaction server that runs on IBM mainframe systems under z/OS or z/VSE. CICS is available for other operating systems, notably i5/OS, OS/2, and as the closely related IBM TXSeries software on AIX, Windows, and Linux, among others. The z/OS implementation is by far the most popular and significant CICS applications can also be run, with very few modifications, on Microsoft's .NET platform.

CICS is a transaction processing system designed for both online and batch activity. On large IBM zSeries and System z9 servers, CICS easily supports thousands of transactions per second, making it a mainstay of enterprise computing. CICS applications can be written in numerous programming languages, including COBOL, PL/I, C, C++, Assembler, REXX, and Java.

Resource Recovery Services (RRS) provide a global sync point manager that any resource manager on z/OS can exploit. It enables transactions to update protected resources managed by many resource managers. RRS is increasingly becoming a prerequisite for new resource managers, and for new capabilities in existing resource managers. Rather than having to implement their own two-phase commit protocol, these products can use the support provided by RRS. In general, RRS requires five log streams to be defined to System Logger.

There are two types of log streams, (1) Coupling facility log streams and (2) Direct Access Storage Device (DASD) only log streams. The main difference between the two types of log streams is the storage medium used to hold interim log data. In a coupling facility log stream, interim storage for log data is contained in coupling facility list structures whereas in a DASD-only log stream, interim storage for log data is contained in local storage buffers on the system. For the embodiments of the invention, both CF and DASD-only log streams are used.

A sysplex is a collection of MVS systems that cooperate, using certain hardware and software products, to process work. A conventional large computer system also uses hardware and software products that cooperate to process work. A major difference between a sysplex and a conventional large computer system is the improved growth potential and level of availability in a sysplex. The sysplex increases the number of processing units and MVS operating systems that can cooperate, which in turn increases the amount of work that can be processed.

Connecting a large number of systems together brings with it special considerations, such as how the large number of systems communicate and how they cooperate to share resources. These considerations affect the overall operation of MVS systems.

A sysplex significantly changes the way MVS systems can share data. As the number of systems increase, it is essential to have an efficient way to share data across systems. The coupling facility enables centrally accessible, high performance data sharing for authorized applications, such as subsystems and MVS components that are running in a sysplex.

These subsystems and components then transparently extend the benefits of data sharing to their applications. Use of the coupling facility substantially improves the feasibility of connecting many MVS systems together in a sysplex to process work in parallel.

Figure 2:
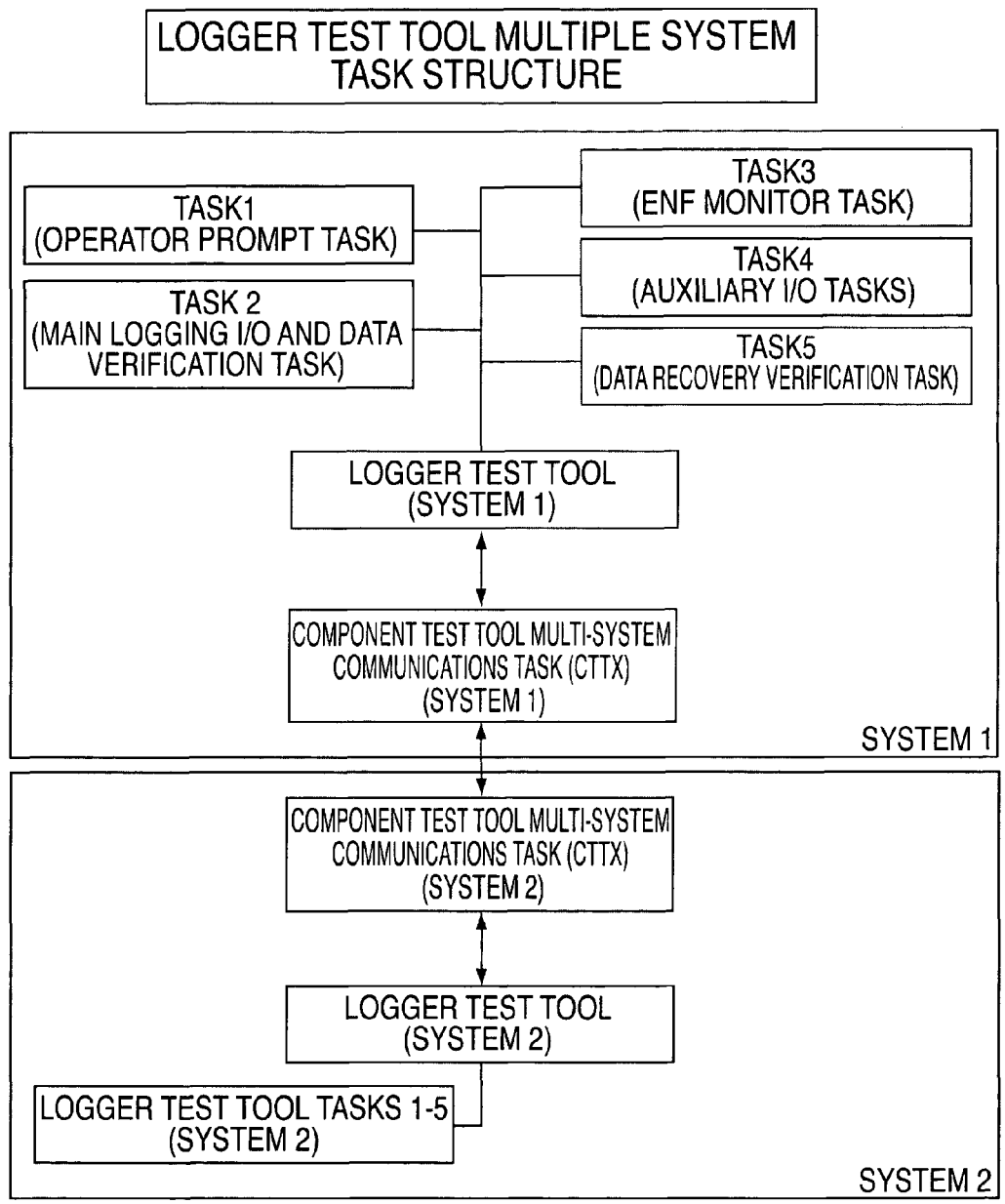
FIG. 2 shows the tasking structure of the Logger Test Tool in a system sysplex environment.

The Logger Autonomic Test Tool is a multitasking z/OS MVS System Logger application that implements the methods and algorithms described by the embodiments of the invention. The application simulates z/OS operating system environmental conditions by causing coupling facility (CF) structure rebuilds, driving log stream offloads from the coupling facility structure to DASD and dynamically updating the attributes of the log streams. The set of tasks described below runs concurrently on each system in a multi-system sysplex. For example, FIG. 2 shows the tasking structure of the test tool in a two-system sysplex. Each of these sets of tasks runs on each system that is part of the multi-system sysplex.

Overview of Tasks

The Logger Autonomic Test Tool is comprised of 4 main tasks plus a 5th recovery verification task.

Task 1 is the user interface task, which allows the system operator to interact with the tool to start/stop processing and query the status of the Logger Autonomic Test Tool.

Task 2 is the Event Notification Facility (ENF) monitor task, which monitors for Logger ENF 48 events that indicate state changes in System Logger and the associated log streams that are in use by the tool.

Task 3 is the main procedure that drives the write/read/verification and externally driven events paths.

Task 4 is an auxiliary task that runs in a separate address space and performs additional write/read/query functions against the same log streams used by Task 3 in order to create additional "busy work" for System Logger in processing the log streams. Each system has one or more auxiliary tasks active.

Task 5 is used only in system failure and disaster recovery scenarios in order to verify System Logger's ability to recover data from secondary recording mediums (such as a duplexed coupling facility structure or a staging data set).

Each instance of the Logger Test tool on a system in the sysplex communicates with another instance using the Component Test Tool multi-system communications task (CTTX) that is already available as part of the test environment used for testing z/OS. CTTX allows the Logger Test Tool to synchronize its startup, shutdown, I/O and verification functions between the different systems in the sysplex.

Application Workload Algorithm

In a multi-threaded sysplex environment, once connections to the log streams have been established, Task 3 uses the following algorithm to drive work against System Logger log streams:

a) Write a number of log blocks, N, to the log stream using the System Logger IXGWRITE service. Each log block is a randomly sized block between 1024 and 64532 bytes. Tracking information is stored inside each log block to aid in the self-verification of ensuring no data loss. Information about each block written is stored in a data structure that is also copied to a dependent write resource to use for verification that no data loss has occurred.

b) Every 5th iteration, force log data to be offloaded from primary storage to DASD by issuing the System Logger IXGOFFLD. This ensures that in later steps, log data is read back from secondary storage as well as primary storage as those represent different processing paths for the System Logger. Any iteration frequency can be used for the purposes of ensuring that offloaded data is read back from secondary storage.

c) Every 5th iteration, perform a dynamic update of the log stream attributes using the System Logger IXGINVNT service. The updated attributes include the SMS-related class names, the log stream sizes and the threshold offload values. This forces pending changes against an active log stream connection, which is then applied appropriately during System Logger processing of offloads. Any iteration frequency can be used for the purposes of ensuring that pending dynamic update changes are applied during system logger offload processing d) Every 10th iteration, use the SETXCF operator command to swap the duplexing of the log stream between CF Structure DUPLEX and SIMPLEX modes. This ensures that processing of the log stream is done in both duplexing modes. Any iteration frequency can be used for the purposes of ensuring that logger processing is done in both CF structure simplex and duplex environments.

e) Read all N log blocks from the log stream that were written during this current iteration. Each iteration randomly starts at either the beginning or end of the log stream and reads in the corresponding direction in order to perform verification that no data loss has occurred using the data structures saved during the IXGWRITEs in step (a) above for comparison.

f) Each system performs a synchronization ("synch up") operation and pauses until all instances of the tool on each system has completed its data verification performed in step (e). This synchronization is accomplished using the CTTX SYNCHUP function.

g) After verification completes successfully, the System Logger IXGDELET service is used to delete the log blocks older than N/2+1 from the log stream.

h) Every 5th iteration, randomly decide whether or not to perform a DISCONNECT/CONNECT against the log stream in order to force pending updates from step (c) above to be committed. Any iteration frequency can be used for the purposes of ensuring that logger disconnect/connect processing is done periodically in order to apply any pending dynamic updates.

If the logging resource becomes temporarily unavailable (i.e. interim storage full) in any of the above steps, the Task 3 waits to be notified by Logger via the ENF Monitor Task (Task 4) that the logging resource is available again. Task 3 and Task 4 communicate via the z/OS MVS WAIT/POST system service.

Where appropriate, the steps above are performed against 3 log streams each iteration. The 3 log streams are defined with different characteristics (STRUCTURE vs. DASDONLY, LOGGERDUPLEX(COND) vs. LOGGERDUPLEX(UNCOND), STG_DUPLEX(YES) vs. STG_DUPLEX(NO) to ensure coverage for each type of log stream that can be processed by System Logger.

Verification of Data and Status Logging

The method for verification of the log block data involves comparing all attributes of each read log block with the expected attribute. The time stamp, log block identifier, log block contents and a specific descriptor attribute indicating whether the log block was read from primary or secondary storage are all used for validating the log block.

z/OS System Logger periodically needs to write "filler" log blocks in the DASD data sets that are used to hold log data that has been offloaded from the CF structure. As the tool writes data to the log stream, it uses calculations to predict the next block identifier that should have been assigned to the next successful write request to the log stream. If the block identifier returned from System Logger is not the predicted value, then this means a filler block exists at this location in the data set. The tool detects this condition and keeps track of the number of filler areas encountered. This information can be later used as part of First Failure Data Capture analysis.

Prior to and following each significant event that occurs during the steps (a) through (g) above, the event is logged to both a data structure and a 4th System Logger log stream to allow the tool to keep track of the last action that was taken. Sysplex-wide synchronization is used to ensure that all tasks on each system in the sysplex are processing the same iteration of steps. Once all systems have indicated that steps (a) through (h) have been completed, all systems continue processing step (a) again in a new iteration.

Additional Workload Data Flow Algorithm

After establishing connections to the log streams, Task 4 adds additional work to the log stream using the following repetitive sequence:

a) write 1 block to the log stream with contents that identifies the block as one written by Task 4.

b) read all log blocks in the log stream from oldest to youngest using the System Logger IXGBRWSE READCURSOR service c) read all log blocks in the log stream from youngest to oldest using the System Logger IXGBRWSE READCURSOR service d) query the log stream attributes using the System Logger IXGQUERY service.

When performing reads in steps (b) and (c) above, Task 4 examines the contents of each log block and only validate the blocks that have the unique system identifier, which indicates that Task 4 wrote the log block. Any log blocks written by Task 3 are read without validating the contents.

Scope and Persistency

Together, the 4 main tasks described above are designed to handle the following:

1) All temporarily unavailable log stream events which require the tool to wait until Logger issues an ENF 48 to indicate when the log stream resource is available again. These events include structure rebuilds; log stream storage full conditions and CF connectivity loss. The Logger test tool ENF monitor task (Task #3) receives the ENF 48 notification from z/OS System Logger and notifies any Logger Test task waiting for this event accordingly.

2) All permanently unavailable log stream events, such as System Logger or entire system failure. For these cases, the tool is able to use a dependent write resource to verify that z/OS System Logger did not lose data while performing log stream resource recovery after the event occurred.

When all connections are established to the log streams by all of the tasks, this establishes a sysplex-wide System Logger application environment with:

1) 4 log streams total per system, (2+2*S per sysplex, where S is the number of systems in the sysplex):

a) 2 structure based log streams with 2 connections per system and S*2 connections across the sysplex b) 1 dasdonly log stream with 2 connections per system c) 1 structure based checkpoint log stream with 1 connection per system First Failure Data Capture First-failure data capture (FFDC) is a general term applied to the set of diagnostic information that is captured automatically when errors occur.

First Failure Data Capture (FFDC) provides an automated snapshot of the system environment when an unexpected internal error occurs. This snapshot is used to provide a better understanding of the state of the system when the problem occurred. This information reduces the need to reproduce errors to get diagnostic information.

First Failure Data Capture (FFDC) is another essential component of the Logger Autonomic Test Tool. Since the log block verification method verifies log blocks sequentially, any discrepancies can be immediately identified and reported to the tester with the expected and actual log block data. An attempt is also made to continue reading the log stream past the point of the first discrepancy in order to help identify how many blocks corresponding to the current iteration are missing.

Additional FFDC is generated by browsing the log stream from oldest to youngest without prejudice and gathering the attributes and log block data of all log blocks in the log stream. Finally, a system dump of System Logger and the Logger Autonomic Test Tool is generated to further potential analysis. The additional data that is captured can aid the tester in visually confirming that the discrepancy noted during the tool's verification step was a result of an unexpected data loss condition.

Disaster Recovery Verification

A disaster recovery plan covers both the hardware and the software required to run critical business applications and the associated processes to transition smoothly in the event of a natural or human-caused disaster. Disaster recovery systems help clients to restore data and systems after fires, terrorist attacks and other crises. Disaster recovery services range from consulting, to data backup at remote sites, to dedicated alternative offices and equipment, to mobile offices that can roll to a customer's site.

In the case of system failure or disaster recovery, Task 5 is used to verify that the data recovered by System Logger is consistent with the data logged by the tool in its dependent write resource. This resource contains status checkpoints for all significant events and contains complete information about what data should reside in the log streams used by the tool. The same verification method used by Task 3 is used here. Once Task 5 has verified that no data loss has occurred, the 4 main tasks can be restarted to resume whatever processing it was performing at the time of the last checkpoint.

In order to achieve solid verification, first, verify the event. It is important to know that the backup was successful and completed without any errors. Then the second phase is to verify the data. Finally, the third phase is to verify the configuration. These steps provide for successful disaster recovery management.

As described above, the embodiments of the invention may be embodied in the form of computer-implemented processes and apparatuses for practicing those processes. Embodiments of the invention may also be embodied in the form of computer program code containing instructions embodied in tangible media, such as system memory, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic events.

While the embodiments of the invention have been particularly shown and described with respect to illustrative and preformed embodiments thereof, it will be understood by those skilled in the art that the foregoing and other changes in form and details may be made therein without departing from the spirit and scope of the embodiments of the invention which should be limited only by the scope of the appended claims.

The invention claimed is:

1. A method for testing a software application program, the method comprising:
   providing randomized input into a logging facility, the logging facility collecting data from multiple systems in a coupling facility log stream;
   performing automated testing of the logging facility in a multi-processing environment;
   performing self-verification of data retrieved from the logging facility to ensure no data loss occurs due to external system events or failures driven by a test tool;
   performing real-time analysis of results received by the test tool based on the randomized input into the logging facility;
   capturing first failure data; and
   performing self-verification of results of a data recovery operation of the logging facility in a disaster recovery scenario;
   wherein performing self-verification of data retrieved includes:
   writing a number of log blocks, N, to the log stream, each log block being a randomly sized block having tracking information stored inside each log block;
   iteratively forcing log data to be offloaded from primary storage to secondary storage;
   iteratively performing a dynamic update of log stream attributes including a class name, log stream size and a threshold offload values;
   iteratively swapping duplexing of the log stream between a Coupling Facility Structure DUPLEX and SIMPLEX modes;
   reading all log blocks from the log stream that were written during this current iteration;
   after verification completes successfully, deleting log blocks older than N/2+1 from the log stream.

2. The method of claim 1, wherein the automated testing of the logging facility is performed simultaneously on multiple systems that share multiple resources.

3. The method of claim 1, wherein the automated testing drives and verifies functions and capabilities of a logging function in the multi-processing environment in order to facilitate an automated regression test (ART) of the logging function.

4. The method according to claim 3, wherein the multi-processing environment uses multiple log streams in order to drive timing windows.

5. The method according to claim 1, further comprising issuing dynamic commands to an operating system in order to alter characteristics of the logging facility.

6. The method according to claim 1, further comprising asynchronously logging events and dynamically updating attributes of permanent logs.

7. The method according to claim 1, wherein when a data loss is detected, relevant first failure data capture information is captured and a determination is made (i) concerning missing data and (ii) concerning one or more causes of the data loss.

8. The method according to claim 1, wherein verification of log block data involves comparing attributes of each read log block with an expected attribute.

9. The method according to claim 8, wherein the verification of the log block involves a time stamp attribute, a log block identifier attribute, a log block contents attribute and a script descriptor attribute.

10. A method for testing a software application program, the method comprising:
    providing randomized input into a logging facility, the logging facility collecting data from multiple systems in a coupling facility log stream;
    performing automated testing of the logging facility in a multi-processing environment; and
    performing a logging function,
    wherein the automated testing of the system logger comprises the following tasks: a user interface task;
    an event notification facility (ENF) monitor task;
    a main procedure task; and
    one or more auxiliary tasks;
    wherein the main procedure task includes:
    writing a number of log blocks, N, to the log stream, each log block being a randomly sized block having tracking information stored inside each log block;
    iteratively forcing log data to be offloaded from primary storage to secondary storage;
    iteratively performing a dynamic update of log stream attributes including a class name, log stream size and a threshold offload values;
    iteratively swapping duplexing of the log stream between a Coupling Facility Structure DUPLEX and SIMPLEX modes;
    reading all log blocks from the log stream that were written during this current iteration;
    after verification completes successfully, deleting log blocks older than N/2+1 from the log stream.

11. The method according to claim 10, wherein the event notification facility (ENF) monitor task monitors for ENF events that indicate state changes in the system logger and the associated log streams.

12. The method according to claim 10, wherein: each auxiliary task runs in a separate address space and performs additional write, read and query functions.

13. The method according to claim 10, wherein a system failure and disaster recovery task is run only when system failure and disaster recovery scenarios are detected.

14. The method according to claim 13, wherein the system failure and disaster recovery task verifies the system logger's ability to recover data from secondary recording mediums.

15. The method according to claim 10, wherein the automated testing of the system logger is performed via a component test tool multi-system communications task (CTTX).

16. The method according to claim 15, wherein the CTTX allows the automated testing of the system logger to synchronize startup, shutdown, input/output (I/O) and verification functions between different systems in a sysplex.

17. A computer program product for testing a software application program, the computer program product comprising:
    a non-transitory storage medium; and
    program instructions stored on the non-transitory storage medium for performing
    a method, the method comprising:
    providing randomized input into a logging facility, the logging facility collecting data from multiple systems in a coupling facility log stream;

performing automated testing of the logging facility in a multi-processing environment; and performing a logging function, wherein the automated testing of the system logger comprises the following tasks:

a user interface task;

an event notification facility (ENF) monitor task;

a main procedure task; and one or more auxiliary tasks;

wherein the main procedure task includes:

writing a number of log blocks, N, to the log stream, each log block being a randomly sized block having tracking information stored inside each log block;

iteratively forcing log data to be offloaded from primary storage to secondary storage;

iteratively performing a dynamic update of log stream attributes including a class name, log stream size and a threshold offload values;

iteratively swapping duplexing of the log stream between a Coupling Facility Structure DUPLEX and SIMPLEX modes;

reading all log blocks from the log stream that were written during this current iteration;

after verification completes successfully, deleting log blocks older than N/2+1 from the log stream.

18. A computer program product for testing a software application program, the computer program product comprising:

a non-transitory storage medium; and program instructions stored on the non-transitory storage medium for performing a method, the method comprising:

providing randomized input into a logging facility, the logging facility collecting data from multiple systems in a coupling facility log stream;

performing automated testing of the logging facility in a multi-processing environment;

performing self-verification of data retrieved from the logging facility to ensure no data loss occurs due to external system events or failures driven by a test tool;

performing real-time analysis of results received by the test tool based on the randomized input into the logging facility;

capturing first failure data; and performing self-verification of results of a data recovery operation of the logging facility in a disaster recovery scenario;

wherein performing self-verification of data retrieved includes:

writing a number of log blocks, N, to the log stream, each log block being a randomly sized block having tracking information stored inside each log block;

iteratively forcing log data to be offloaded from primary storage to secondary storage;

iteratively performing a dynamic update of log stream attributes including a class name, log stream size and a threshold offload values;

iteratively swapping duplexing of the log stream between a Coupling Facility Structure DUPLEX and SIMPLEX modes;

reading all log blocks from the log stream that were written during this current iteration;

after verification completes successfully, deleting log blocks older than N/2+1 from the log stream.

* * * * *